United States Patent [19]

Garg

[11] Patent Number: 5,527,369
[45] Date of Patent: Jun. 18, 1996

[54] MODIFIED SOL-GEL ALUMINA

[75] Inventor: Ajay K. Garg, Northborough, Mass.

[73] Assignee: Saint-Gobain/Norton Industrial Ceramics Corp., Worcester, Mass.

[21] Appl. No.: 341,249

[22] Filed: Nov. 17, 1994

[51] Int. Cl.$^6$ .................................................. B24D 3/34
[52] U.S. Cl. ........................................... 51/309; 51/307
[58] Field of Search ........................ 51/293, 307, 309; 501/127

[56] References Cited

U.S. PATENT DOCUMENTS

| | | |
|---|---|---|
| 4,314,827 | 2/1982 | Leitheiser et al. .................... 51/309 |
| 4,518,397 | 5/1985 | Leitheiser et al. .................... 51/309 |
| 4,543,107 | 9/1985 | Rue ............................................ 51/309 |
| 4,770,671 | 9/1988 | Monroe et al. ....................... 51/293 |
| 4,881,951 | 11/1989 | Wood et al. .......................... 51/309 |
| 5,132,789 | 5/1994 | Wood ................................... 501/127 |
| 5,139,978 | 8/1992 | Wood ................................... 501/127 |
| 5,164,348 | 11/1992 | Wood ................................... 501/127 |
| 5,372,620 | 12/1994 | Rowse et al. ......................... 51/309 |

*Primary Examiner*—Deborah Jones
*Attorney, Agent, or Firm*—David Bennett

[57] ABSTRACT

Alpha alumina abrasive grits with grain boundaries modified with at least one of yttria and a rare earth metal oxide, and one or more oxides selected from the oxides of magnesium and/or transition elements, perform at enhanced levels if at least the yttria and/or rare earth metal oxide modifiers are present within the body of the grit in concentrations at least as high as their concentrations at the surface of the grit.

22 Claims, 4 Drawing Sheets

MODIFIED SOL-GEL ALUMINA

BACKGROUND OF THE INVENTION

This invention relates to alumina abrasive materials and specifically to alumina made by a sol-gel process. In such processes a sol or gel of a precursor of alpha alumina is formed and then dried and fired to the alpha form. The selected precursor is most frequently boehmite but earlier precursors such as alumina trihydrate can be used. One advantage of such aluminas in that they do not use a fusion process and are therefore much more efficient in energy usage. They are also characterized by crystal sizes in the range of a few microns and this seems to be associated with good grinding properties when compared to the relatively large crystal chips obtained by crushing the product of the fusion process.

These sol-gel processes are now well-known in the art having been the subject of great interest since the early '80s when the first sol-gel alumina abrasive grits were developed. The development was given a great boost in the mid-80s with the introduction of the vastly superior seeded sol-gel aluminas in which the sol-gel was seeded with a substance capable of lowering the temperature at which the conversion to alpha alumina occurs. It is generally accepted that this operates by a mechanism involving epitaxial growth of alpha alumina on the surface of the seed which therefore needs to be of the same crystallographic type as alpha alumina and with similar lattice parameters within the crystals. The result is a very fine, uniform sub-micron crystalline structure that seems to be associated with good abrasive performance. When reference is made to a sol-gel alumina hereinafter, it is to be understood that this is intended to cover all processes of the above type and their obvious variants that result in aluminous abrasive grains with a high density, small crystal size, (below about 10 microns for example), and high hardness, (greater than about 16 Gpa for example).

Other ways of obtaining smaller crystalline structures within the sol-gel alumina art includes the incorporation of cell growth control agents which can restrain crystal growth such that quite uniform structures with crystal sizes ranging from just over 1 to about 10 microns depending on the process and the agent used. Such additives in general do not reduce the transition temperature at which alpha alumina is formed indeed some, such as silica, can actually increase it. They can however introduce interesting properties. Such modification seems to be associated with modified fracture mechanics which in some applications can be advantageous.

There is however a tendency for the modifiers to be concentrated at the surfaces of the abrasive grits and this means that any beneficial effect associated with the presence of the modifiers can be expected to be inconstant.

The present invention however provides aluminous abrasive grits in which the concentration of modifying components is essentially constant across the full thickness of the abrasive grit and a novel process by which such modified aluminous abrasive grits can be made.

DESCRIPTION OF THE INVENTION

The present invention comprises a novel alpha alumina in the form of abrasive grits wherein the alumina comprises, as modifying components, yttria and/or an oxide of at least one rare earth metal, (such as lanthanum, praseodymium, neodymium, samarium, gadolinium, erbium, ytterbium, dysprosium and cerium), and further including at least one oxide selected from the oxides of magnesium, titanium, chromium, manganese, iron, cobalt, nickel, zinc and lithium, wherein at least the yttria and/or rare earth metal oxide(s) among said modifying components have an average concentration within the grit that is equal to or greater than the average concentration within 20 microns of the surface of the grit.

The grit can also comprise other separately identifiable crystalline phases between the alumina crystals such as spinels, silica and zirconia. However the alumina has an essentially uniform crystalline morphology and the modifying components themselves are not identifiable in separate crystalline phases such as magnetoplumbite structures between or within the alumina crystal structure when examined by SEM spectroscopy on an etched and polished surface at normal magnification levels, (up to about 50K). Since the modifying components are not separately identifiable, it is assumed for the purposes of this application that the components are located primarily at the grain boundaries though it is understood that there may be partial dissolution of a minor amount of the modifying component(s) in the alumina lattice. This location in the grain boundaries in itself implies some concentration limitations as there is a limit to the amount of modifying component that can be accommodated in the grain boundaries.

In general it has been found preferable that the total amount of modifying component present in the abrasive grits of the invention is less than about 2% by weight and more preferably less than about 1% by weight, (measured as the oxide and based on the total weight of the abrasive grit), if segregation into separate, identifiable crystalline phase inclusions is to be avoided.

At least the yttria and rare earth metal oxide, (and preferably all), modifying components are essentially uniformly distributed within grain boundaries throughout the whole abrasive grit and by this is meant that when a microprobe is used to determine trace element concentration across a cross-section of the grit, the concentration of the modifier remains essentially constant, within the margin of variability of measurements taken at comparable locations in the grit. A grain boundary, as the term is used in this specification means a zone that extends up to 10 nanometers on either side of the junction of two contiguous alumina grains. Grains are understood to be alumina crystals having high angle grain boundaries with all contiguous grains. They therefore have a crystallographic orientation that is different from the crystallographic orientation of all contiguous grains.

The invention also comprises a method of producing such a uniform distribution of the modifying components throughout the grits which comprises forming a gel of an alumina precursor, drying and firing the gel until a porous transition/alpha alumina phase has been produced. This alumina phase refers to an alumina that has been fired till the phase transition to the alpha phase has begun or is about to begin but before sintering has advanced to closed porosity. This alumina phase is then infiltrated with a solution comprising the modifying components in the form of their soluble, heat-decomposable salts and an additive that reacts with water to generate a base and breaks down to form volatile gases below the temperature at which closed porosity is obtained. Penetration of the modifier component solution into the grits may conveniently be enhanced by drawing a vacuum on the sample during infiltration.

While a uniform concentration is preferred, it is also possible to have a grit with a surface-depleted modifying component concentration. This could be achieved by for example applying a layer of non-modified alumina to the surface of grits that have been treated as aforesaid or by leaching the modifying components from the surface area. This might be desirable for example to prevent the valuable modifiers being dissolved from the grits during the formation of a vitreous bonded abrasive wheel. It is well known that with very small, (submicron), alumina crystal structures, the grit becomes increasingly susceptible to attack by a vitreous bond and the above technique may minimize the negative effect on the abrasive properties of the grain in such applications.

DETAILED DESCRIPTION OF THE INVENTION

Figure 1:
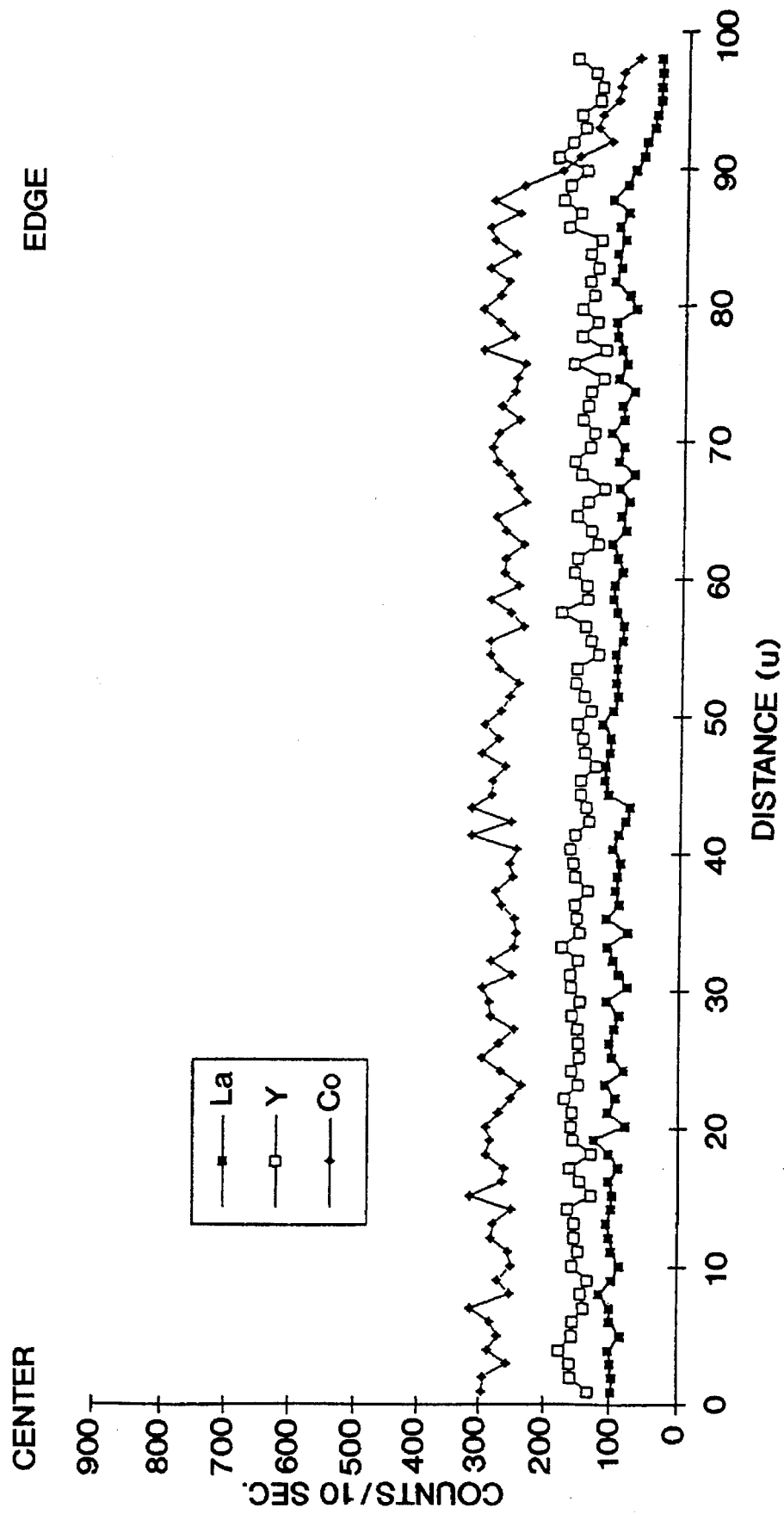

The total amount of modifying components present in the aluminous abrasive grits of the invention is preferably less than 2 wt. % and more preferably less than about 1 wt. % of the total weight of the grits. However the most preferred compositions comprise only from about 0.02 to about 0.35 and more preferably from about 0.06 to about 0.20 wt. % of any one modifying component. The modifiers must comprise at least one of yttria and a rare earth metal oxide. The most preferred combinations comprise both lanthana and yttria. In addition the modifiers comprise at least one further modifier selected from the oxides of the rare earth elements, magnesium, cobalt, titanium, chromium, manganese, iron, nickel and zinc and mixtures thereof. Within the above group the preferred modifiers are oxides of magnesium, cobalt, iron, titanium and nickel.

The incorporation of the modifying components is preferably accomplished by infiltrating a porous transitional/alpha alumina with a solution comprising soluble salts of the components. If the infiltration is done without further preventive action, the component may migrate to the drying surface during the drying operation resulting in a very inhomogeneous distribution of the component through the grit structure. In fact there may be a significantly greater concentration of the component at the surface than elsewhere. One aspect of this invention is the discovery of a means of ensuring that the distribution remains uniform. It has been discovered that if the pH of the system is raised by the incorporation of a substance that will form a base on contact with water and will be removed without trace during the firing operation, the modifying components remain uniformly distributed through the alumina and migrate to the grain boundaries of the alpha alumina when these are formed upon firing. A preferred base-forming additive is formamide but others such as acetamide, hydroxylamine, methylamine, urea and the like could be substituted to achieve the same effect. The base-forming additive is preferably incorporated with the modifying components but it can also be added separately after infiltration has been accomplished. When added separately, direct addition of a base such as ammonia can be used. Formation of the base in situ may be accelerated by the application of heat.

The modifying components are added as soluble salts and these are most conveniently the nitrates since these are completely decomposed to form the oxides at temperatures well below the temperature at which closed porosity occurs. Other soluble salts having this characteristic, such as the acetates and certain chlorides and sulfates, can be substituted.

The surface area of the alumina phase impregnated is quite important to the ease with which the uniform distribution is achieved. This is because the higher the surface area, the greater the ability of the alumina surface, which is essentially basic with referenece to the modifying component solution, to provide sites for reaction with the acidic species in the modifying component solutions.

Certain metals are found to have a deleterious effect on the quality of alumina abrasive grits obtained by sol-gel processes. These include alkali metals such as sodium and potassium. It is therefore preferred to carry out all the processing of the alumina in deionized or distilled water. This includes both the preparation of the initial sol-gel and the infiltration solution comprising the modifying components.

DRAWINGS

The invention is illustrated using four graphs which chart the variation in the concentration of the indicated modifying components across a grit from the center to the edge.

Figure 2:
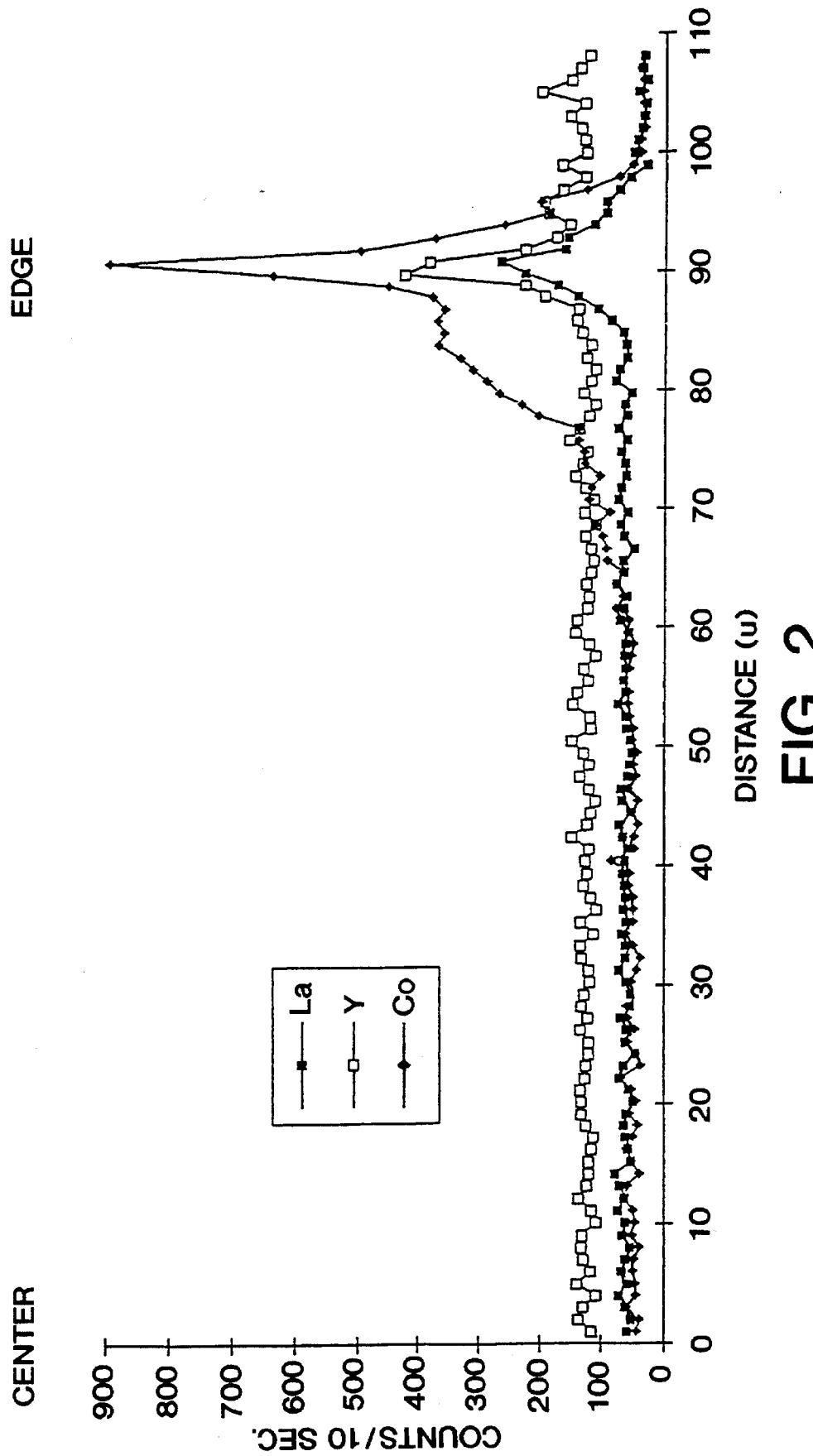

FIGS. 1 and 2, which are referred to in Example 1, display the concentration variation for, respectively, a composition according to the invention and one in which the modifiers have a higher concentration at the edge.

Figure 3:
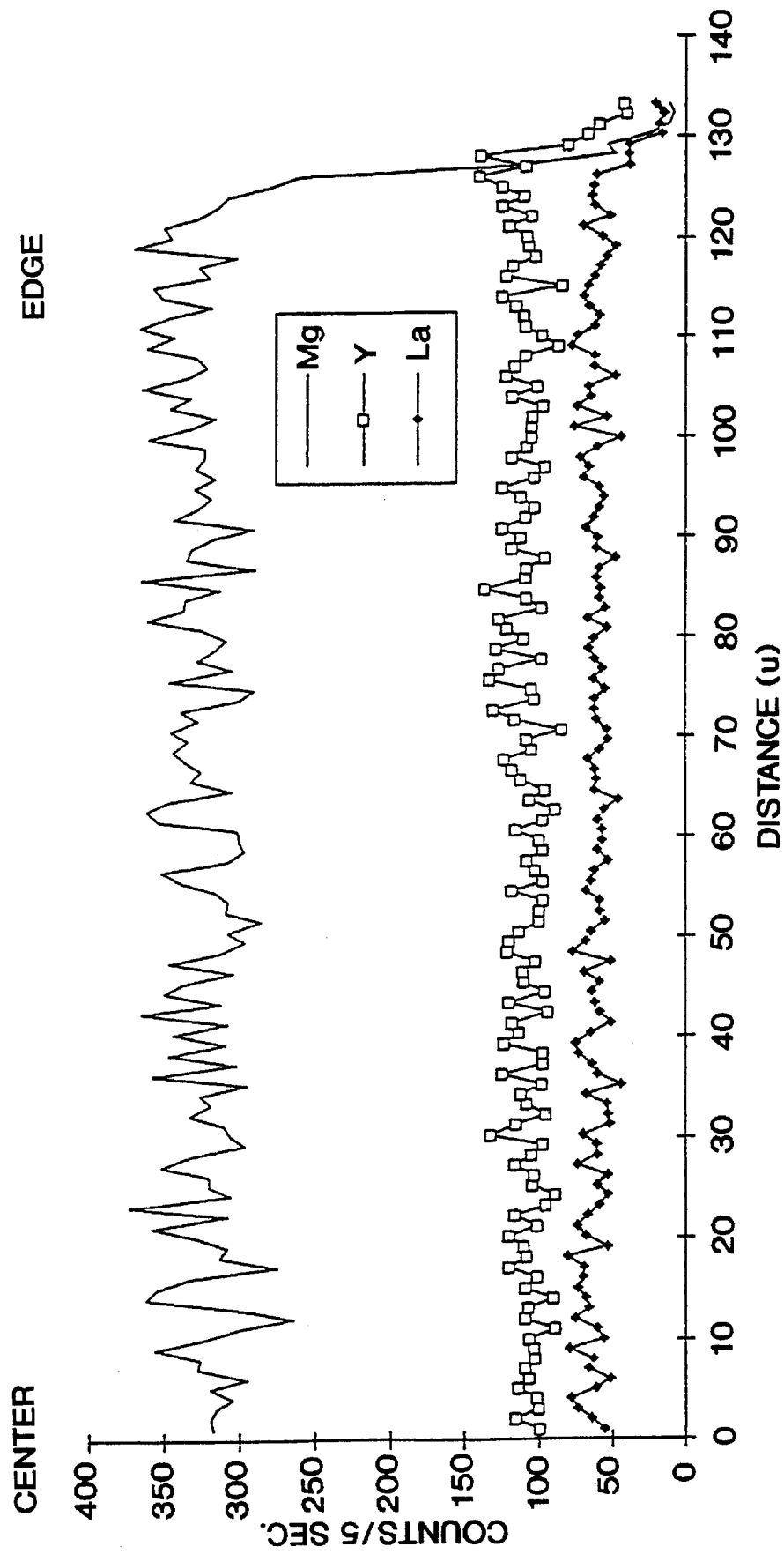
Figure 4:
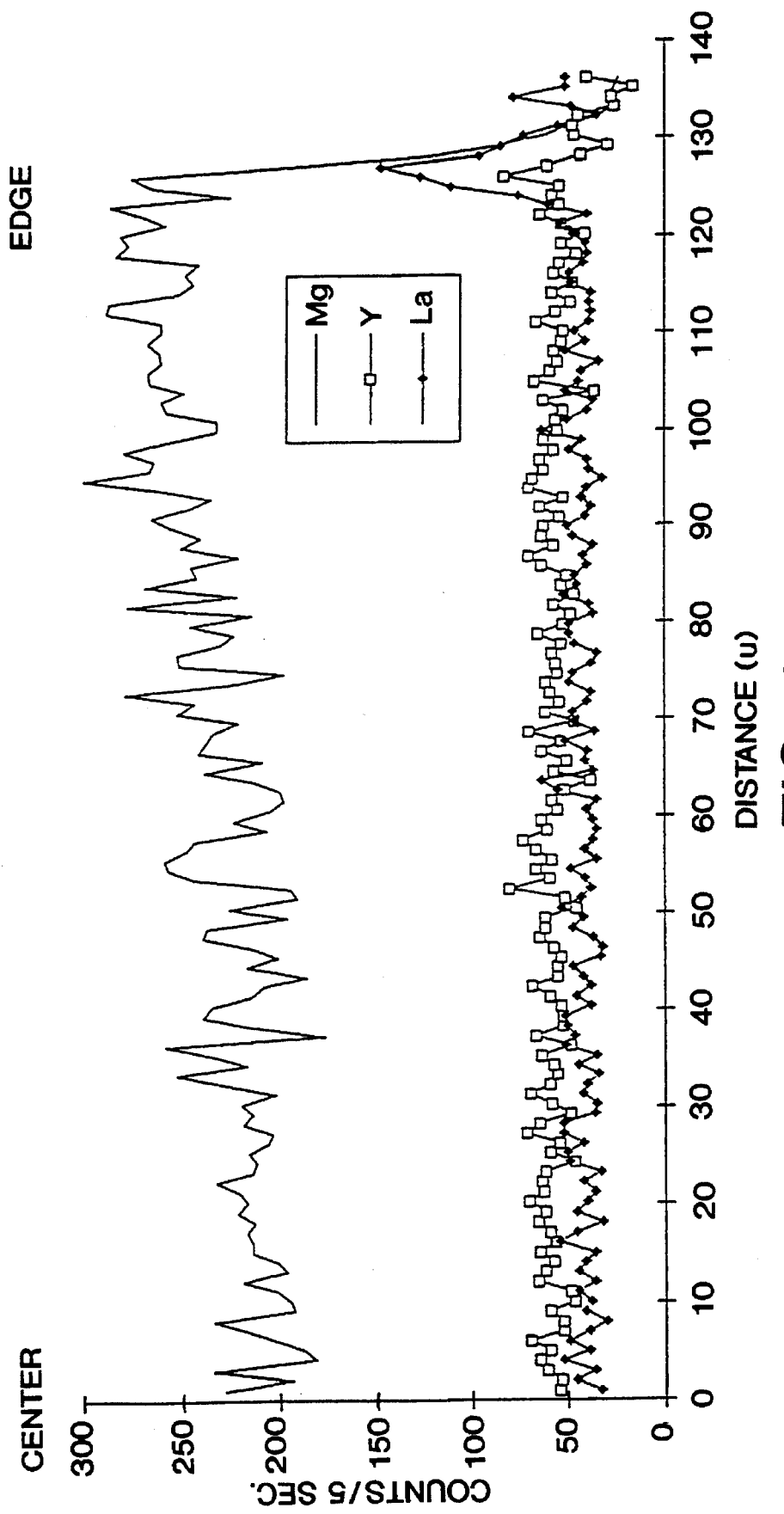

FIGS. 3 and 4, which are referred to in Example 2, display the concentration variation for, respectively, a composition according to the invention and one in which the modifiers have a higher concentration at the edge.

DESCRIPTION OF SPECIFIC EMBODIMENTS

The invention is now described with reference to certain specific examples which are understood to be for the purposes of illustration only and imply no essential limitation on the scope of the invention.

In the Examples that follow crystal sizes were measured on polished surfaces that were thermally etched at 50° C. below the sintering temperature for 10 minutes. An SEM technique was used and crystal sizes were determined from the micrograph obtained by measuring the average intercept of the crystals lying on a straight line drawn across the micrograph.

To determine the concentration of the modifying components, samples were prepared by mounting grits in an epoxy resin and polishing the surface to optical reflectiveness. The concentration of each element was measured at one micron intervals along a straight line across the polished surface from the center to the surface of the grit using a Cameca Camebax microprobe having a plurality of linked spectrometers each tuned to detect a different specific element. For example one spectrometer had a TAP crystal tuned to the Ka peak of magnesium to trace the concentration variation of that element across the thickness of the grit. Reaching the epoxy layer confirmed that the edge of the grit had been reached. The counting time at each measuring step was set at 5 or 10 seconds. The results were in some cases set forth in chart form, several of which appear in the attached Drawings. The power setting for the machine was 25 Kv and the beam current (Faraday) was 20 nA.

The significance of having the modifying components dispersed uniformly through the grit was explored by conducting grinding tests using the grits in a vitreous bonded abrasive wheel. In each case the grit selected was 80 grit and the test performed involved wet OD cylindrical grinding. The wheels were prepared in exactly the same way using a commercial vitreous bond of the kind described in U.S. Pat. No. 4,543,107 and had the same grade, (hardness, in this case "K"), and structure, (relative grit spacing, in this case "8"). The wheels were either 7.6 cm or 12.7 cm in diameter and 1.27 cm in thickness. Before use the wheels were each dressed using a diamond roll. During the testing the wheels were run at 9000 sfpm a 52100 workpiece, (approximately 10 cm in diameter and 0.64 cm in thickness was urged against the wheel at three different in-feed rates: LOW (0.3 in$^3$/min/in); MEDIUM (0.6 in$^3$/min/in); and HIGH (1.1 in$^3$/min/in). On each workpiece only 0.2 cm to 0.3 cm were removed.

EXAMPLE 1

In this Example the performance of a vitreous bonded grinding wheel, (INV.-1), made using a seeded sol-gel alumina that comprises certain modifying components uniformly distributed within the grits in accordance with the invention is compared with:
1. a vitreous bonded wheel made using the same bond and the same seeded sol-gel alumina but without the modifying components (C1); and
2. a vitreous bonded wheel made using the same bond and the same seeded sol-gel alumina and the same modifying components in the same amounts but with the modifying components concentrated largely at the surfaces of the grits, In each evaluation that is reported hereafter the preparation of the sol-gel alumina proceeded along identical lines up to the sintering of the grain. This first step described is therefore common to the preparation of all samples evaluated.

Preparation of sol-gel alumina.

A mixing tank was charged with 2000 pounds of water. An aqueous slurry containing 4% by weight of finely divided alpha alumina particles with a surface area of about 120 m$^2$/g was prepared by milling an approximately 8 wt. % aqueous dispersion of sub-micron sized particles of alpha alumina in a Sweco mill using low purity alumina media. This slurry, (260 pounds), was added to the tank which was well mixed and evacuated to remove air bubbles. It had a Ph of about 4.

The dispersion from the tank was pumped through a mixer at a rate of 2.8 g/min along with 0.16 g/min of a 21% nitric acid solution. The product was a gel that was dried, roll-crushed and calcined at 600°–800° C. in a rotary kiln.

It was this calcined product that was used as a basis for all the following examples.

Preparation of INV.-1

A solution of modifying components was prepared by dissolving in 10,200 g of deionized water, 159 g of cobalt nitrate hexahydrate, 17.1 g of lanthanum nitrate pentahydrate, and 21.6 g of yttrium nitrate hexahydrate. When all the salts had been dissolved, 1800 g of formamide were also added to the solution.

The calcined sol-gel alumina material prepared as described above, (2000 g), was placed in a container which was evacuated to remove air from the pores and 2666 g of the modifying component solution described above were added while the vacuum was held. After the material had been fully submerged, the vacuum was released. Excess solution was drained from the sample which was then dried at 120° C. before being fired in a pre-heated rotary furnace at 1270° C. for ten minutes. The product had a density of 3.88 g/cc; a hardness of 21.4 Gpa; and a crystal size of 0.15 micron. Microprobe analysis of grits of this material indicated uniform distribution of the modifying components throughout the grits, (see FIG. 1).

Preparation of the Unmodified Control (C1)

The calcined sol-gel material described above was fired in a preheated rotary furnace for a period of 10 minutes at a temperature of 1290° C. The product had a density of 3.89 g/cc; a hardness of 22.3 Gpa; and a crystal size of 0.19 micron. Analysis showed that it was essentially free of the modifying components.

Preparation of the Surface Enriched Control (C2)

An ammonia solution was prepared by dissolving 600 g of 30% ammonia solution in 17,400 g of deionized water. A modifying component solution was prepared by dissolving in 18,000 g of deionized water, 192.6 g of cobalt nitrate hexahydrate; 21.1 g of lanthanum nitrate pentahydrate; and 33.4 g of yttrium nitrate hexahydrate.

A container was then charged with 1800 g of the calcined sol-gel alumina described above and 3600 g of the ammonia solution were added. Excess solution that remained outside the pores was removed. The wet product was then added to 3600 g of the modifying component solution which was then stirred for 15 minutes. Excess remaining outside the pores was removed and the material was dried at 120° C. The material was then fired in a pre-heated rotary furnace at 1265° C. for 10 minutes and was then found to have a density of 3.89 g/cc; a hardness of 22.0 Gpa; and a crystal size of 0.15 micron. Microprobe analysis of abrasive grits of this material, (FIG. 2), showed higher concentrations of the modifying components at the surface than in the interior of the grits.

To evaluate the practical significance of the modifier distribution differences the three sample products described above were formed into abrasive grits and the grits were then incorporated into separate abrasive wheels using a commercial vitreous bond of Norton Company according to the method described above. The wheels obtained, which were identical except with respect to the modifying components, were then tested to measure their Grindability Index, (that is the square of the metal removal rate divided by the product of the horse power drawn during the grinding and the wheel wear rate). The test was carried out as described above.

TABLE 1

| | Grindability Index | | |
|---|---|---|---|
| INFEED RATE | INV.-1 FLAT PROF. | C1 (CONTROL) | C2 SURF. CONC. |
| LOW | 14.2 | 8.0 | 11.4 |
| MEDIUM | 13.6 | 11.9 | 10.7 |
| HIGH | 12.9 | 9.8 | 8.2 |

It is clearly seen from the above data that the wheels made using the modified sol-gel abrasive particles of the invention show the best improvement over the prior art products when subjected to lower pressure grinding forces. However improvements are evident at all infeed rates. More interestingly the improvement is significantly better than the C2 sample which contained the same modifying components in essentially the same amounts but distributed to give a higher surface concentration.

EXAMPLE 2

In this Example basically the same comparison as is described above in Example 1 is repeated with a different combination of modifying components.

Preparation of INV.-2

A solution was prepared by adding to 10,200 g of deionized water, 252.7 g of magnesium nitrate hexahydrate; 27.75 g of lanthanum nitrate pentahydrate; and 30.1 g of yttrium nitrate hexahydrate. When the salts were fully dissolved, 1800 g of formamide were added.

A container was charged with 3000 g of the calcined sol-gel alumina material prepared as described above and the container was evacuated to remove trapped air from the pores. The solution of the modifying components described above was added, (4000 g), while the material was still under vacuum. When the material was fully submerged, the vacuum was released. The material was dried at 120° C. and then fired in a pre-heated rotary furnace at 1310° C. for 10 minutes. The product had a density of 3.88 g/cc; a hardness of 22.1 Gpa; and a crystal size of 0.11 micron. Microprobe analysis of abrasive grits made from this material, (FIG. 3), showed the modifying components distributed essentially uniformly throughout the grits.

Preparation of a Surface Enriched Control (C3)

A modifying component solution was prepared by dissolving in 18,000 g of deionized water, 241.2 g of magnesium nitrate hexahydrate; 50.4 g of lanthanum nitrate pentahydrate; and 79.2 g of yttrium nitrate hexahydrate.

The ammonia solution described in Example 1, (3600 g), was added to 1800 g of the calcined sol-gel alumina material described above. Excess solution from outside the pores was removed and the wet material was added to 3600 g of the modifier solution described above and stirred for about 15 minutes. Excess solution from outside the pores was removed and the material was dried at 120° C. before being fired at 1280° C. in a preheated rotary furnace for 10 minutes. The product had a density of 3.89 g/cc; a hardness of 21.6 Gpa; and a crystal size of 0.16 micron. Microprobe analysis of abrasive grits made from this product showed an elevated concentration of at least two of the modifying components, (lanthana and yttria), at the surface of the abrasive grits with comparatively little within the bodies of the grits. This was determined using the same microprobe technique used in Example 1 and the results are presented in chart form in FIGS. 3 (Inv.-2) and 4 (C3). Interestingly although the magnesia was present in relatively large quantities throughout the grit, even this well distributed modifier had an elevated concentration in the vicinity of the edge by comparison with the grit center.

As before the effect of the distribution was evaluated in grinding tests conducted in the manner described above. The results are set forth in Table 2 below:

TABLE 2

| | Grindability Index | | |
|---|---|---|---|
| INFEED RATE | INVENT. 2 FLAT PROF. | C1 (CONTROL) | C3 SURF. CONC. |
| LOW | 21.3 | 8.0 | 12.3 |
| MEDIUM | 17.3 | 11.9 | 11.3 |
| HIGH | 13.6 | 9.8 | 9.7 |

It will be seen that the same pattern of superiority is shown as was evident in Example 1.

EXAMPLE 3

This Example compares the performance of products made according to the invention, (INV.-3), with the C1 control described above, and with two other controls, (C4 and C5), containing different combinations of modifying components.

Preparation of INV.-3

The technique used to produce the modified sol-gel material was essentially that used to make INV.-1 except that the modifying component solution comprised 2550 g of deionized water, 7.17 g of ferric nitrate nanohydrate, 11.01 g of cobalt (II) nitrate hexahydrate, 11.01 g of nickel (II) nitrate hexahydrate, 14.93 g of chromium (III) nitrate nanohydrate, 7.22 g of lanthanum nitrate pentahydrate, 9.63 g of yttrium nitrate hexahydrate and 450 g of formamide.

Firing of the dried material took place at 1310° C. for 5 minutes and the product had a density of 3.89 g/cc; a hardness of 20.9 Gpa; and a crystal size of 0.12 micron.

Preparation of C4 and C5

These comparative Examples are somewhat different from those in Examples 1 and 2. The same impregnation technique was used with different combinations of modifiers so as to isolate the effect of the modifiers from the mode of impregnation. The only difference between the C4, C5 and INV.-3 samples therefore lay in the composition of the modifier solution used.

C4 Solution
2550 g of deionized water
7.17 g of ferric nitrate nanohydrate
11.01 g of cobalt (II) nitrate hexahydrate
11.01 g of nickel (II) nitrate hexahydrate
14.93 g of chromium (III) nitrate nanohydrate
450 g of formamide.

C5 Solution
10200 g of deionized water
28.88 g of lanthanum nitrate pentahydrate
38.6 g of yttrium nitrate hexahydrate
1800 g of formamide.

The C4 material was fired at 1280° C. for 5 minutes and had a density of 3.92 g/cc; a hardness of 21.1 Gpa; and a crystal size of 0.18 micron.

The C5 material was fired at 1345° C. for 10 minutes and had a density of 3.86 g/cc; a hardness of 22.4 Gpa; and a crystal size of 0.16 micron.

When subjected to the grinding tests described above, grits made from the above materials performed as shown in Table 5 below

TABLE 5

| SAMPLE | GRINDABILITY LOW INFEED | GRINDABILITY MED. INFEED | GRINDABILITY HIGH INFEED |
|---|---|---|---|
| INV.-3 | 13 | 17.8 | 16.8 |
| C1 | 9.3 | 9 | 10.1 |
| C4 | 6.8 | 9.1 | 10.8 |
| C5 | 9.4 | 10.3 | 10.5 |

This data clearly indicates that the formulation of the modifying component mixture is also important in addition to the method of incorporation. Together with the data from Examples 1 and 2 it demonstrates the combined importance of the features of the present invention.

EXAMPLE 4

This Example illustrates yet another combination of modifying components producing a product according to the invention, (INV.-4). No comparative examples were produced at the same time as this preparation but the same general techniques for preparation and evaluation were used as are described in the previous Examples.

A solution of the modifying components was made by dissolving in 10,200 g of deionized water:
28.68 g of ferric nitrate nanohydrate
44.04 g of cobalt (II) nitrate hexahydrate
44.04 g of nickel (II) nitrate hexahydrate
59.72 g chromium(III) nitrate nanohydrate
28.88 g of lanthanum nitrate pentahydrate
38.52 g of yttrium nitrate hexahydrate
72.12 g of magnesium nitrate hexahydrate
40.12 g of manganese (II) nitrate tetrahydrate
246.54 g of a colloidal titania sol and
800 g of formamide.

The titania sol was prepared by mixing 40 g of titanium (IV) isopropoxide with 160 g of deionized water, adding 48 g of 70% nitric acid and mixing until the mixture became clear.

The sol-gel alumina was impregnated with the above mixture and dried in the manner described in Example 1 and was fired at 290° C. for 10 minutes to yield a product with a density of 3.89 g/cc; a hardness of 20.9 Gpa; and a crystal size of 0.12 micron.

When subjected to the grinding tests described above grinding wheels containing abrasive grits produced from the above material had "Grindability Indices" as follows:

Low Infeed 17

Medium Infeed 13.1

High Infeed 12.6

The chemical analysis of the grit samples produced in Examples 1–4 showed the following concentrations, (in wt. %), of the indicated oxides.

| MODIFIER | IN-1 | IN-2 | IN-3 | IN-4 | C2 | C3 | C4 | C5 |
|---|---|---|---|---|---|---|---|---|
| LANTHANA | 0.06 | 0.11 | 0.11 | 0.10 | 0.07 | 0.08 | — | 0.12 |
| YTTRIA | 0.07 | 0.10 | 0.10 | 0.12 | 0.06 | 0.06 | — | 0.14 |
| COBALT OX. | 0.34 | — | 0.13 | 0.08 | 0.32 | — | 0.13 | — |
| MAGNESIA | — | 0.31 | — | 0.12 | — | 0.42 | — | — |
| NICKEL OX. | — | — | 0.10 | 0.03 | — | — | 0.10 | — |
| MAN. DIOX. | — | — | — | 0.11 | — | — | — | — |
| FERRIC OX. | — | — | 0.05 | 0.06 | 0.03 | — | 0.05 | — |
| TITANIA | 0.11 | 0.11 | 0.15 | 0.25 | 0.11 | 0.11 | 0.15 | 0.15 |

In the above Table IN-1 should be read with C2 and IN-2 should be read with C3.

Amounts of 0.02% or less for ferric oxide and magnesia are considered in the "background noise" and are indicated by "—." A higher background level of titania of about 0.1 to 0.15% is usual in sol-gel aluminas derived from high quality boehmites, (as a result of the method by which the boehmite is manufactured). Amounts in this range are nearly always present therefore.

What is claimed is:

1. Alpha alumina abrasive grits wherein the alumina has an essentially uniform crystalline morphology said grits comprising as modifying components:

a) at least one of yttria and a rare earth metal oxide; and b) one or more oxides of metals selected from the group consisting of magnesium, titanium, chromium, manganese, iron, cobalt, nickel, zinc and lithium; wherein at least the modifying component(s) selected from group a) have an average concentration within the grit that is equal to or greater than the average concentration within 20 microns of the surface of the grit.

2. Abrasive grits according to claim 1 in which the modifying component(s) selected from group a) are distributed essentially uniformly within the grits.

3. Abrasive grits according to claim 1 in which all modifying components are distributed essentially uniformly within the grits.

4. Abrasive grits according to claim 1 in which the rare earth metal oxide is lanthana.

5. Abrasive grits according to claim 1 in which the total amount of the modifying components represents from about 0.10 to about 2% of the weight of the alpha alumina and each individual group a) component represents from about 0.02 to about 0.35% of the alpha alumina weight.

6. Abrasive grits according to claim 1 which comprise from 0.02 to about 0.2 wt. % each of yttria and lanthana up to a maximum of about 0.2 wt. %; and from about 0.01 to about 0.4 wt. % each of at least one oxide of a metal selected from the group consisting of magnesium, titanium, chromium, manganese, iron, cobalt, nickel, zinc, up to a maximum combined weight of all modifying components of about 1.5 wt. %.

7. Abrasive grits according to claim 1 in which the alumina grits have a sub-micron crystalline morphology.

8. Alpha alumina abrasive grits wherein the alumina has an essentially uniform sub-micron crystalline morphology said grits comprising as modifying components:

a) yttria and lanthana; and b) one or more oxides of metals selected from the group consisting of magnesium, titanium, chromium, manganese, iron, cobalt, nickel, zinc and lithium; wherein at least the modifying component(s) selected from group a) are distributed essentially uniformly within the grits.

9. Abrasive grits according to claim 8 which comprise from 0.02 to about 0.2 wt. % each of yttrium and lanthanum up to a maximum of about 0.22 wt. %; and from about 0.01 to about 0.2 wt. % each, of at least one oxide of a metal selected from the group consisting of magnesium, titanium, chromium, manganese, iron, cobalt, nickel, zinc, up to a maximum of about 0.8 wt. %.

10. A process for the production of alumina abrasive grits modified by incorporation of modifying components which process comprises drying and firing a gel of an alpha alumina precursor until a porous alumina phase has been produced; then infiltrating the porous alumina with a solution of modifying components in the form of soluble, heat-decomposable salts together with a base-generating additive that reacts with water to generate a base and breaks down to form volatile gases below the temperature at which alpha alumina is formed in the reaction; and then firing to a temperature high enough to convert the porous alumina to the alpha phase, wherein the modifying additives are:

a) at least one of yttria and a rare earth metal oxide; and b) one or more oxides of metals selected from the group consisting of magnesium, titanium, chromium, manganese, iron, cobalt, nickel, zinc and lithium.

11. A process according to claim 10 in which the amount of modifying component(s) selected from group a) is such as to produce an average concentration within the grit that is equal to or greater than the average concentration within 20 microns of the surface of the grit.

12. A process according to claim 11 in which the amount of modifying components added is such that all modifying components are distributed essentially uniformly within the grits.

13. A process according to claim 10 in which the base-generating additive is selected from the group consisting of formamide, acetamide and urea.

14. A process according to claim 10 in which the total amount of modifying components added is less than about 1.5% based on the weight of the alumina.

15. A process according to claim 10 in which the infiltration is carried while a vacuum is drawn on the porous alumina material.

16. A process according to claim 10 in which the alumina gel also comprises a nucleating agent that is effective to reduce the temperature of transition to alpha alumina and generate a submicron alumina crystalline structure.

17. A process according to claim 16 in which the total amount of modifying components added is less than about 1.0% based on the weight of the alumina.

18. A process according to claim 16 in which the base-generating additive is selected from the group consisting of formamide, acetamide and urea.

19. A coated abrasive comprising abrasive grits according to claim 1.

20. An bonded abrasive tool comprising abrasive grits according to claim 1.

21. A coated abrasive comprising abrasive grits according to claim 8.

22. A bonded abrasive tool comprising abrasive grits according to claim 8.

* * * * *